3,849,499
METHOD FOR PREPARING SULFOXIDES AND SULFONES

Alexandr Dmitrievich Malievsky, Malaya Dorogomilovskaya ulitsa 14, kv. 34; Viktor Vladimirovich Vints, Sumskaya ulitsa 6, korpus 4, kv. 116; Nikolai Markovich Emanuel, Vorobievskoe shosse 2"b", kv. 44; and Viktor Nikolaevich Parfenov, Uchinskaya ulitsa 1a, kv. 58, all of Moscow, U.S.S.R.
No Drawing. Filed May 17, 1972, Ser. No. 254,238
Int. Cl. C07c *147/00*
U.S. Cl. 260—607 A          5 Claims

ABSTRACT OF THE DISCLOSURE

A method for preparing sulfoxide and sulfones by oxidizing sulfides and sulfoxides with atmospheric oxygen in the presence of readily oxidizable organic compounds at a temperature between 20 and 130° C. with subsequent isolation of the main product.

Sulphoxides are used as selective solvents, mild oxidants, extracting agents for rare elements, etc.

Sulfones are used in the manufacture of plasticizing agents, weed killers, as selective solvents for aromatic compounds, etc.

---

This invention relates to a method for preparing sulfoxides and sulfones. Sulfoxides are widely used as selective solvents, mild oxidants, extracting agents for rare elements, etc.

Sulfones are used in the preparation of plasticizers, herbicides, as selective solvents for aromatic compounds, etc.

Methods are known for preparing sulfoxides and sulfones oxidation of sulfides in the gaseous and liquid phases with atmospheric oxygen or with oxygen-containing gases in the presence of catalysts, and also oxidation of sulfides with hydrogen peroxide. For example, a method for preparing sulfoxides is known in which a mixture of hydrogen peroxide and perchloric acid and also an emulsifying agent are added with intense stirring to a petroleum fraction ($t_{b.p.}$ 200–400° C.) at a temperature of 20–23° C. The mixture is agitated for 30 minutes, allowed to settle for at least three hours, and sulfoxides are then isolated. The yield is about 85 percent by weight. (Reports of the Academy of Sciences of the U.S.S.R., vol. 173, No. 1, p. 104.)

The disadvantage inherent in this method consists in the complexity of the process which is due to the employment of explosive materials and also due to the use of the emulsifying agent necessary to mix hydrogen peroxide with organic compounds.

Another method is known for preparing sulfoxides, for example dibutyl sulfoxide, in which dibutyl sulfide oxidized for two hours with atmospheric oxygen supplied at a rate of 8–10 liters per hour at a temperature of between 70 and 100° C. The process is carried out in a medium of benzene, or without any solvent, in the presence of a catalyst, for example oxides or salts of metals ($MnO_2$, $MoO_3$, $Cr_2O_3$, etc.). The ratio of the catalyst to the sulfide is 1:0.73. The yield of the sulfoxide is about three percent by weight per gram of catalyst. If $MnO_2$ is used as catalyst, the yield is 32–40 percent by weight per gram of catalyst. (Chemistry of Sulphur-Organic Compounds Contained in Petroleums and Petrochemical Products, vol. 7, 37, Moscow, 1964.) The disadvantage of this method consists in that the yield of the main product is low.

The object of this invention is to increase the yield of the main product and to simplify the process for its preparation.

The object has been attained in a method for preparing sulfoxides and sulfones by oxidizing sulfides or sulfoxides in the presence of atmospheric oxygen with subsequent isolation of the main product according to the invention, wherein the oxidation is carried out in the presence of readily oxidizable organic compounds at a temperature from 20 to 130° C.

The process of oxidation should preferably be carried out in a medium of an organic solvent, for example benzene or acetone.

Acetaldehyde, propionaldehyde or methyl ethyl ketone are used as the easily oxidizable organic compounds.

In order to accelerate the process of oxidation, metals of variable valence are used as the catalyst. Cobalt stearate should preferably be used as the catalyst.

The proposed method can be carried out as follows. The starting materials, i.e. sulfides or sulfoxides, are oxidized with air oxygen in the presence of readily oxidizable organic compounds at a temperature between 20 and 130° C.

The readily oxidizable organic compounds interact with the molecular oxygen to form intermediate compounds containing active oxygen which in the process of oxidation turns the starting sulfide into the corresponding sulfoxide and further into the corresponding sulfone.

Acetaldehyde, propionaldehyde and others should preferably be used as the readily oxidizable organic compounds.

The process of oxidation can be carried out in the presence of catalysts, e.g. compounds of metals having variable valence, preferably in the presence of cobalt stearate.

The process can be carried out in a medium of an organic solvent or without it. Benzene or acetone should be used as the organic solvent.

The oxidation reaction should be controlled by taking samples of the reaction mixture and analyzing them by the partition gas chromatographic and volumetric methods.

The main product is isolated by any of the known methods. The yield of a sulfoxide is 90–95 percent with reference to the reacted sulfide, and the yield of a sulfone, up to 100 percent by weight with reference to the reacted sulfoxide.

The proposed method can be carried out both by continuous and bath processes.

The proposed method simplifies the process and increases the yield of sulfoxides to 90–95 percent by weight and of sulfones to 100 percent by weight.

If acetaldehyde is used as the readily oxidizable organic component in the process according to the invention, acetic acid is produced as a side product together with the main product of the reaction. The acid can be recovered and utilized.

For a better understanding of the invention the following examples of its embodiment are given by way of illustration.

EXAMPLE 1

Into a stainless steel reaction kettle of the autoclave type were charged 100 ml. (8.4 g., 0.0575 mole) of dibutyl sulfide, 10 ml. (7.8 g., 0.177 mole) of acetaldehyde and 60 ml. of benzene taken as solvent. The unit was sealed hermetically. The pressure was raised to 50 kg./sq. cm. and the reaction mixture heated to a temperature of 90° C. Air was bubbled through the mixture at a rate of 25 liters per hour. In 2.5 hours 0.49 mole/liter (6.43 g., 0.0396 mole) of dibutyl sulfoxide, and 0.04 mole/liter (0.57 g. 0.0032 mole) of dibutyl sulfone were formed in the reaction mixture. The yield of dibutyl sulfoxide with respect to the reacted sulfide is 92 percent by weight, and of dibutyl sulfone, 8 percent by weight.

EXAMPLE 2

Into a stainless steel reaction kettle of the autoclave type were charged 10 ml. (8.4 g., 0.0575 mole) of dibutyl sulfide, 10 ml. (7.8 g., 0.177 mole) of acetaldehyde and 60 ml. benzene as the solvent. The kettle was sealed, a pressure of 50 atm. was build up inside it, and the reaction temperature was raised to 65° C. Air was bubbled through the reaction mixture at a rate of 25 liters per hour. In 3.5 hours the reaction mixture contained 0.362 mole/liter (4.65 g., 0.0286 mole) of dibutyl sulfoxide.

The yield of dibutyl sulfoxide with respect to the reacted dibutyl sulfide is 94.5 percent by weight, and the yield of dibutyl sulfone was 5.5 percent by weight. The analysis of the products was carried out with the aid of gas partition chromatography and titration.

EXAMPLE 3

Into a stainless steel autoclave were charged 10 ml. (8.4 g. of 0.0575 mole) of dibutyl sulfide, 10 ml. 7.8 g., 0.177 mole) of acetaldehyde and 60 ml. of benzene taken as solvent. The autoclave was sealed, the pressure was raised to 50 atm. and the reaction mixture was heated to a temperature of 90° C. Air was passed through the reaction mixture at a rate of 25 liters per hour. In 90 minutes the reaction mixture contained 0.36 mole/liter (4.64 g., 0.0286 mole) of dibutyl sulfoxide and 0.03 mole/liter (0.36 g., 0.0024 mole) of dibutyl sulfone. The yield of dibutyl sulfoxide with respect to the reacted sulfide was 92 percent, and of dibutyl sulfone, 8 percent by weight. The products were analyzed by the partition gas chromatography and titration methods.

EXAMPLE 4

Into a stainless steel autoclave were charged 10 ml. (8.4 g., 0.0575 mole) of dibutyl sulfide, 10 ml. (7.8 g., 0.177 mole) of acetaldehyde and 60 ml. of acetone. The autoclave was sealed, the pressure was raised to 35 atm. and the reaction temperature to 75° C. Air was bubbled through the reaction mixtures at a rate of 25 liters per hour. In three hours the reaction mixture contained 0.484 mole/liter (6.22 g., 0.0383 mole) of dibutyl sulfoxide. The yield of the sulfoxide was 93.2 percent by weight, and of dibutyl sulfone, 6.8 percent by weight.

The products were analyzed by the partition gas chromatography and titration methods.

EXAMPLE 5

Into a stainless steel autoclave were charged 15 ml. (11.7 g., 0.265 mole) of acetaldehyde, 10 ml. (8.4 g., 0.0575 mole) of dibutyl sulfide and 55 ml. of benzene. The autoclave was sealed, the pressure was raised to 50 atm., the reaction mixture was heated to a temperature of 87° C. and air was bubbled through it at a rate of 25 liters per hour. In two hours, 0.26 mole/liter (3.37 g., 0.021 mole) of dibutyl sulfoxide and 0.02 mole/liter (0.285 g., 0.0016 mole) of dibutyl sulfone was formed in the reaction mixture. The yield of dibutyl sulfoxide with respect to the reacted sulfide was 92.8 percent by weight, and of dibutyl sulfone, 7.2 percent by weight.

The products were analyzed by partition gas chromatography and titration methods.

EXAMPLE 6

Into a stainless steel autoclave were charged 10 ml. (7.8 g., 0.177 mole) of acetaldehyde, 10 ml. (8.4 g., 0.0575 mole) of dibutyl sulfide and 60 ml. of benzene. The reaction was carried out in the presence of cobalt stearate taken in amount of 0.156 g. The autoclave was sealed, the pressure raised to 50 atm., the reaction mixture heated to a temperature of 90° C. and air bubbled through it. In one hour the reaction mixture contained 0.35 mole/liter (4.54 g., 0.0271 mole) of dibutyl sulfoxide and 0.005 mole/liter (0.05 g., 0.0003 mole) of dibutyl sulfone. The yield of dibutyl sulfoxide with respect to the reacted sulfide was 99 percent by weight, and of dibutyl sulfone, 1 percent by weight. The products were analyzed by partition gas chromatography and titration methods.

EXAMPLE 7

Into a stainless steel autoclave were charged 10 ml. (8.3 g., 0.143 mole) of propionaldehyde, 10 ml. (8.4 g., 0.0575 mole) of dibutyl sulfide and 60 ml. of benzene. The autoclave was sealed, the pressure was raised to 50 atm., the reaction mixture was heated to a temperature of 85° C., and air was passed through it at a rate of 25 liters per hour. In three hours the reaction mixture contained 0.3 mole/liter (3.86, 0.024 mole) of dibutyl sulfoxide. The yield of dibutyl sulfoxide with respect to the reacted dibutyl sulfide is 89.5 percent by weight. The yield of dibutyl sulfone was 10.5 percent by weight. The products were analyzed by partition gas chromatography and titration methods.

EXAMPLE 8

Into a stainless steel autoclave were charged 10 ml. (7.8 g., 0.177 mole) of acetaldehyde, 6.26 g. (0.0304 mole) of dibutyl sulfoxide, 1.4 ml. (1.18 g., 0.008 mole) of dibutyl sulfide and 62.7 ml. of benzene. The autoclave was sealed, the pressure was raised to 50 atm., the reaction mixture was heated to 92° C. and air was passed through it at a rate of 25 liters per hour. In 2.5 hours the reaction mixture contained 0.42 mole/liter (6 g., 0.0336 mole) of dibutyl sulfone. The yield of the dibutyl sulfone with respect to the reacted dibutyl sulfide was 100 percent by weight. The products were analyzed by partitoin gas chromatography and titration.

EXAMPLE 9

Into a stainless steel autoclave were charged 10 ml. (7.8 g., 0.177 mole) of acetaldehyde and 70 ml. of (58.4 g., 0.4 mole) of dibutyl sulfide. The reaction kettle was sealed, the pressure was raised to 50 atm., the reaction temperature was elevated to 90° C. and air was bubbled through the reaction mixture for five hours at a rate of 25 liters per hour. As a result, 0.25 mole/liter (3.24 g., 0.02 mole) of dibutyl sulfoxide and 0.043 mole/liter (0.605 g., 0.0034 mole) of dibutyl sulfone were produced. The yield of dibutyl sulfoxide is 85 percent by weight and of dibutyl sulfone, 14.5 percent by weight.

EXAMPLE 10

Into a stainless steel autoclave were charged 10 ml. (8.4 g., 0.0575 mole) of dibutyl sulfide and 90 ml. of methyl ethyl ketone.

The autoclave was sealed, the pressure was raised to 50 atm., the reaction mixture was heated to a temperature of 130° C. and air was bubbled through it at a rate of 20 liters per hour. The reaction continued for 2.5 hours to give 0.015 mole/liter of dibutyl sulfoxide. The yield of the product with respect to the starting dibutyl sulfide was about 3 percent by weight.

EXAMPLE 11

Into a stainless steel autoclave were charged 10 ml. (7.8 g., 0.177 mole) of acetaldehyde, 8.7 ml. (7.3 g., 0.05 mole) of dibutyl sulfide and 61.3 ml. of benzene.

The autoclave was sealed, the pressure was raised to 25 atm., the reaction mixture was heated to a temperature of 30° C. and the reaction was continued for three hours. As a result the reaction mixture contained 0.12 mole/liter (1.56 g., 0.0096 mole) of dibutyl sulfoxide and $0.35 \times 10^{-2}$ mole/liter (0.05 g., $2.8 \times 10^{-4}$ mole) of dibutyl sulfone.

The yield of dibutyl sulfoxide with reference to the reacted dibutyl sulfide was 97.2 percent by weight, and of dibutyl sulfone, 2.8 percent by weight.

EXAMPLE 12

Into a stainless steel autoclave were charged 10 ml. (7.8 g., 0.177 mole) of acetaldehyde, 4 ml. (3.36 g., 0.054 mole) of dimethyl sulfide, 0.156 g. of cobalt stearate and 66 ml. of acetone. The autoclave was sealed, the pressure was raised to 50 atm., the reaction mixture was heated to a temperature of 79° C. and air was passed through it at a rate of 25 liters per hour. The process was continued for 90 minutes to give 0.37 mole/liter (2.31 g., 0.0296 mole) of dimethyl sulfoxide and $1.88 \times 10^{-3}$ mole/liter of ($1.41 \times 10^{-2}$ g., $1.5 \times 10^{-4}$ mole) of dimethyl sulfone. The yield of dimethyl sulfoxide with respect to the reacted sulfide is 99.5 percent by weight, and of dimethyl sulfone, 0.5 percent by weight. The products are analyzed by partition gas chromatography and titration.

EXAMPLE 13

Into a stainless steel autoclave were charged 10 ml. (7.8 g., 0.177 mole) of acetaldehyde, 1 ml. (0.861 g., 0.00427 mole) of dihexyl sulfide and 50 ml. of benzene. The autoclave was sealed, the pressure was raised to 50 atm., the reaction mixture was heated to a temperature of 75° C. and air was passed through it at a rate of 10 liters per hour. The reaction was continued for 90 minutes to give 0.063 mole/liter (0.837 g., 0.00384 mole) of dihexyl sulfoxide, and 0.007 mole/liter 0.0998 g., $4.26 \times 10^{-4}$ mole) of dihexyl sulfone. The yield of dihexyl sulfoxide with respect to the reacted sulfide was 90 percent by weight and the yield of dihexyl sulfone was 10 percent by weight. The products were analyzed by partition gas chromatography and titration.

We claim:

1. A method for preparing a dialkyl sulfoxide or sulfone having 1 to 6 carbon atoms in each alkyl group comprising oxidizing a dialkyl sulfide or sulfoxide having 1 to 6 carbon atoms in each alkyl group with atmospheric oxygen in the presence of a readily oxidizable compound selected from the group consisting of acetaldehyde, propionaldehyde and methyl ethyl ketone at a room temperature of from 20° to 130° C. and isolating the resultant product.

2. A method according to claim 1 wherein the readily oxidizable compound is present in an amount of 0.44 to 41.5 moles per mole of sulfide or sulfoxide being oxidized.

3. A method according to claim 1, wherein the oxidation is carried out in a solvent selected from the group consisting of benzene and acetone.

4. A method according to claim 1, wherein the oxidation is carried out in the presence of cobalt stearate as a catalyst.

5. A method according to claim 1, wherein the sulfide is dibutyl sulfide.

References Cited
FOREIGN PATENTS

| | | | |
|---|---|---|---|
| 175,958 | 6/1965 | Russia | 260—609 A |
| 213,832 | 12/1968 | Russia | 260—607 A |
| 239,325 | 5/1969 | Russia | 260—607 A |

LEWIS GOTTS, Primary Examiner

D. R. PHILLIPS, Assistant Examiner

U.S. Cl. X.R.

260—530 R